US010427035B2

(12) United States Patent
Schmitz et al.

(10) Patent No.: US 10,427,035 B2
(45) Date of Patent: Oct. 1, 2019

(54) GAME CONTROLLER WITH REMOVABLE TRIGGER ACCESSORY

(71) Applicant: Microsoft Technology Licensing, LLC, Redmond, WA (US)

(72) Inventors: Aaron Schmitz, Redmond, WA (US); Jonathan Shea Robinson, Kirkland, WA (US); Gabriel Michael Rask Gassoway, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 326 days.

(21) Appl. No.: 15/078,900

(22) Filed: Mar. 23, 2016

(65) Prior Publication Data
US 2016/0361639 A1 Dec. 15, 2016

Related U.S. Application Data

(60) Provisional application No. 62/173,303, filed on Jun. 9, 2015.

(51) Int. Cl.
*A63F 13/24* (2014.01)
*A63F 13/98* (2014.01)
(Continued)

(52) U.S. Cl.
CPC .............. *A63F 13/24* (2014.09); *A63F 13/20* (2014.09); *A63F 13/218* (2014.09); *A63F 13/98* (2014.09);
(Continued)

(58) Field of Classification Search
CPC ........ A63F 13/24; A63F 13/20; A63F 13/218; A63F 13/98
See application file for complete search history.

(56) References Cited

U.S. PATENT DOCUMENTS 559,416 A    5/1896  Soper
2,616,698 A  11/1952 Singer
(Continued)

FOREIGN PATENT DOCUMENTS

CA    2913093 A1    11/2014
CN  103474291 A    12/2013
(Continued)

OTHER PUBLICATIONS

Lowe, Scott, "MLG PRO-Circuit Controllers Sport Swappable D-Pads and Thumbsticks", Published on: Aug. 22, 2011 Available at: http://www.ign.com/articles/2011/08/23/mlg-pro-circuit-controllers-sport-swappable-d-pads-and-thumbsticks.
(Continued)

*Primary Examiner* — William H McCulloch, Jr.
*Assistant Examiner* — Yingchuan Zhang
(74) *Attorney, Agent, or Firm* — Alleman Hall Creasman & Tuttle LLP

(57) ABSTRACT

A game controller includes a trigger-activation sensor, a sensor-activation feature, and a trigger-retention feature. The sensor-activation feature is moveable relative to the trigger-activation sensor. The trigger-activation sensor outputs a control signal based on a relative position of the sensor-activation feature and the trigger-activation sensor. The trigger-retention feature is configured to removably affix a selected removable trigger accessory to the game controller. The selected removable trigger accessory is one of a plurality of differently configured removable trigger accessories removably affixable to the game controller. The selected removable trigger accessory is configured to change the relative position of the sensor-activation feature and the trigger-activation sensor based on finger manipulation of the selected removable trigger accessory when the selected
(Continued)

removable trigger accessory is removably affixed to the game controller.

20 Claims, 9 Drawing Sheets

(51) Int. Cl.
*A63F 13/20* (2014.01)
*A63F 13/218* (2014.01)

(52) U.S. Cl.
CPC ... *A63F 2300/10* (2013.01); *A63F 2300/1043* (2013.01); *A63F 2300/1056* (2013.01)

(56) References Cited

U.S. PATENT DOCUMENTS

| | | |
|---|---|---|
| 3,996,441 A | 12/1976 | Ohashi |
| 4,292,481 A | 9/1981 | Barnes et al. |
| 4,755,072 A | 7/1988 | Hoornweg |
| 5,239,450 A | 8/1993 | Wall |
| 5,326,063 A | 7/1994 | Stevens |
| 5,436,640 A | 7/1995 | Reeves |
| 5,607,158 A | 3/1997 | Chan |
| 5,615,083 A | 3/1997 | Burnett |
| 5,724,068 A | 3/1998 | Sanchez et al. |
| 5,883,690 A | 3/1999 | Meyers et al. |
| 5,995,034 A | 11/1999 | Liu |
| 6,354,945 B1 | 3/2002 | Furuki et al. |
| 6,510,048 B2 | 1/2003 | Rubenson et al. |
| 6,659,870 B2 | 12/2003 | Sobota |
| 6,752,719 B2 | 6/2004 | Himoto et al. |
| 7,026,564 B1 | 4/2006 | Savicki, Jr. et al. |
| 7,177,724 B2 | 2/2007 | Cantello et al. |
| 7,315,260 B1 | 1/2008 | Lam et al. |
| 7,387,573 B2 | 6/2008 | Silverbrook et al. |
| 7,425,681 B2 | 9/2008 | Xu et al. |
| 7,458,716 B2 | 12/2008 | Kato |
| 7,533,884 B1 | 5/2009 | Padget |
| 7,758,424 B2 | 7/2010 | Riggs et al. |
| 7,927,216 B2 | 4/2011 | Ikeda et al. |
| 7,976,385 B2 | 7/2011 | Riggs et al. |
| 7,982,149 B2 | 7/2011 | Larsen et al. |
| 7,993,203 B1 | 8/2011 | Walker, II et al. |
| 8,096,884 B2 | 1/2012 | Beadell et al. |
| 8,100,772 B2 | 1/2012 | Sternberg et al. |
| 8,241,126 B2 | 8/2012 | Ambinder et al. |
| 8,289,192 B2 | 10/2012 | O'Donnell |
| 8,366,547 B2 | 2/2013 | Haswell et al. |
| 8,480,491 B2 | 7/2013 | Burgess et al. |
| 8,523,684 B2 | 9/2013 | Lutnick et al. |
| 8,592,681 B2 | 11/2013 | Alderson et al. |
| 8,634,873 B2 | 1/2014 | Jones et al. |
| 8,641,525 B2 | 2/2014 | Burgess et al. |
| 8,653,389 B2 | 2/2014 | Liang et al. |
| 8,678,927 B2 | 3/2014 | Hammontree et al. |
| 8,784,208 B2 | 7/2014 | Borrel |
| 8,932,135 B2 | 1/2015 | Coe |
| 9,089,770 B2 | 7/2015 | Burgess et al. |
| 9,308,450 B2 | 4/2016 | Burgess et al. |
| 9,308,451 B2 | 4/2016 | Burgess et al. |
| 9,352,229 B2 | 5/2016 | Burgess et al. |
| 9,492,744 B2 | 11/2016 | Burgess et al. |
| 9,533,219 B2 | 1/2017 | Burgess et al. |
| 9,550,116 B2 | 1/2017 | Burgess et al. |
| 9,707,479 B2 | 7/2017 | Burgess et al. |
| 9,878,238 B2 | 1/2018 | Burgess et al. |
| 2002/0000975 A1 | 1/2002 | Perkins et al. |
| 2002/0052237 A1 | 5/2002 | Magill |
| 2002/0128064 A1 | 9/2002 | Sobota |
| 2004/0222970 A1 | 11/2004 | Martinez et al. |
| 2006/0025217 A1 | 2/2006 | Hussaini et al. |
| 2006/0040740 A1 | 2/2006 | DiDato |
| 2006/0126323 A1 | 6/2006 | Pomes |
| 2009/0025094 A1 | 1/2009 | York et al. |
| 2009/0054146 A1 | 2/2009 | Epstein et al. |
| 2009/0070971 A1* | 3/2009 | Kamada ............... A63F 13/02 24/495 |
| 2009/0088250 A1 | 4/2009 | Carlson et al. |
| 2009/0139360 A1 | 6/2009 | Diccion |
| 2009/0218160 A1 | 9/2009 | Baluch et al. |
| 2009/0239665 A1 | 9/2009 | Minuto et al. |
| 2010/0087252 A1 | 4/2010 | Tan et al. |
| 2010/0167825 A1 | 7/2010 | Sternberg et al. |
| 2010/0184514 A1 | 7/2010 | Tsai |
| 2010/0279773 A1 | 11/2010 | Atzmon |
| 2010/0298053 A1 | 11/2010 | Kotkin |
| 2010/0328203 A1 | 12/2010 | Hsu |
| 2011/0011712 A1 | 1/2011 | Klinghult |
| 2012/0050232 A1 | 3/2012 | Ikeda et al. |
| 2012/0274563 A1 | 11/2012 | Olsson |
| 2012/0309261 A1 | 12/2012 | Boman et al. |
| 2012/0322555 A1 | 12/2012 | Burgess et al. |
| 2013/0249830 A1 | 9/2013 | Quek |
| 2013/0257717 A1 | 10/2013 | Tian et al. |
| 2013/0267321 A1 | 10/2013 | Burgess et al. |
| 2014/0049911 A1 | 2/2014 | Corbin et al. |
| 2014/0113723 A1 | 4/2014 | Burgess et al. |
| 2014/0121023 A1 | 5/2014 | Tahara et al. |
| 2014/0121913 A1 | 5/2014 | Sata |
| 2014/0210717 A1 | 7/2014 | Hoover, Jr. et al. |
| 2014/0247246 A1 | 9/2014 | Maus |
| 2015/0297993 A1 | 10/2015 | Burgess et al. |
| 2015/0297994 A1 | 10/2015 | Burgess et al. |
| 2015/0321092 A1 | 11/2015 | Burgess et al. |
| 2015/0321093 A1 | 11/2015 | Burgess et al. |
| 2016/0193529 A1 | 7/2016 | Burgess et al. |
| 2016/0228765 A1 | 8/2016 | Rubio |
| 2016/0296837 A1 | 10/2016 | Burgess et al. |
| 2016/0346682 A1* | 12/2016 | Burgess ............... A63F 13/24 |
| 2017/0001108 A1* | 1/2017 | Burgess ............... A63F 13/24 |
| 2017/0157509 A1 | 6/2017 | Burgess et al. |

FOREIGN PATENT DOCUMENTS

| | | | |
|---|---|---|---|
| CN | 103681065 A | 3/2014 | |
| EP | 1380924 A1 | 1/2004 | |
| EP | 3053635 A1 | 8/2016 | |
| FR | 3032355 A1 | 8/2016 | |
| FR | 3032355 B1 | 2/2017 | |
| FR | 3016226 B1 | 3/2017 | |
| FR | 3020762 B1 | 12/2017 | |
| GB | 574431 | 1/1946 | |
| GB | 2463341 A | 3/2010 | |
| WO | 9936136 A1 | 7/1999 | |
| WO | 2014051515 A1 | 4/2014 | |
| WO | 2014187923 A1 | 11/2014 | |
| WO | WO2014187923 | * 11/2014 | ............ A63F 13/02 |
| WO | 2015078994 A1 | 6/2015 | |

OTHER PUBLICATIONS

Leclair, Dave, "Sinister: The PC Game Controller Reinvented", Published on: Feb. 10, 2014 Available at: http://www.gizmag.com/sinister-game-controller/30775/.

"Modular Gamepad: Swappable Controls, Any Console", Published on: Mar. 16, 2015 Available at: http://hackaday.io/project/2782-modular-gamepad-swappable-controls-any-console.

M.L., Rey, "Rat Pro X Gaming Mouse Boasts Swappable Sensors", Retrieved on: Jun. 5, 2015 Available at: http://inventorspot.com/articles/rat-pro-x-gaming-mouse-boasts-swappable-sensors.

"Razer Sabertooth—Gaming Controller for Xbox 360", Published on: Jan. 4, 2013 Available at: http://www.razerzone.com/gaming-controllers/razer-sabertooth.

"The Razer Sabertooth Gaming Controller for the Xbox 360/PC", Youtube Video. Published on: Jun. 10, 2013 Available at: https://www.youtube.com/watch?feature=player_embedded&v=aaRDcV1Ryr8.

"Generic Thumbies Game Button Touch Screen Controllers for iPhone / iPod Touch", Retrieved on: Jun. 5, 2015 Available at: http://www.amazon.com/Generic-Thumbies-Button-Screen-Controllers/dp/B00BNOQK1U.

(56) References Cited

OTHER PUBLICATIONS

ISA European Patent Office, International Search Report and Written Opinion Issued in PCT Application No. PCT/US2016/032237, dated Jul. 22, 2016, WIPO, 11 pages.
Sorrel, C., "Saitek Cyborg Rumblepad: Removable Swappable Buttons," Wired Website, Available Online at www.wired.com/2007/09/saitek-cyborg-r/, Sep. 12, 2007, 4 pages.
Goldman, T., "Modular Xbox 360 Controller Fabricated With Bag of Rice," Escapist Magazine Website, Available Online at www.escapistmagazine.com/news/view/101205-Modular-Xbox-360-Controller-Fabricated-With-Bag-of-Rice, Jun. 9, 2010, 3 pages.
"CH Products: Industrial joysticks," CH Products Catalog, Available Online at www.chproducts.com/images/chproducts/CH-COMPLETE_CATALOG_2011.pdf, Available as Early as Jan. 1, 2011, Retrieved on Feb. 2, 2015, 154 pages.
Varias, L., "Donya iPhone Gamepad Stickers: Five Buttons to Play Them All," Technabob Website, Available Online at http://technabob.com/blog/2011/03/30/donya-iphone-gamepad-stickers/, Mar. 30, 2011, 3 pages.
"Keyes Thumb Joystick Module for Arduino (Works with Official Arduino Boards)," DealExtreme Website, Available Online at www.dx.com/p/repair-parts-replacement-analog-stick-module-for-ps2-controller-black-121340#.VNCxkJ2Ufv4, Available as Early as May 13, 2012, Retrieved on Feb. 3, 2015, 6 pages.
Steves, "RoastGeek Button Pad v 1.0," Roast Geek Website, Available Online at www.roastgeek.com/wordpress/, Jul. 29, 2012, 37 pages.
Witcombe, J., "New Sony PS3 Move patent reveals possible update to controllers," GadgetHelpline Website, Available Online at www.gadgethelpline.com/sony-ps3-mov-patent-reveals-update-controllers/, Jan. 14, 2013, 9 pages.
"Generic Thumbies Game Button Touch Screen Controllers for iPhone / iPod Touch," Amazon.com Website, Available Online at www.amazon.com/Generic-Thumbies-Button-Screen-Controllers/dp/B00BNOQK1U, Available as Early as Aug. 20, 2013, Retrieved on Apr. 10, 2015, 4 pages.
Stilphen, S., "Atari VCS/2600 Controllers," 2600 Connection: The Complete Atari 2600 Video Computer System Resource Website, Available Online at www.2600connection.com/faq/controllers/faq_controllers.html, Available as Early as Mar. 4, 2014, As Updated Dec. 7, 2014, 218 pages.
King, A., "Nintendo patent shows device with interchangeable controls," Wii U Daily Website, Available Online at http://wiiudaily.com/2014/05/nintendo-patent-shows-device-with-interchangeable-contrls/, May 1, 2014, 12 pages.
"This might be our first look at Nintendo's next handheld," Gamespot Website Forum, Available Online at www.gamespot.com/forums/system-wars-314159282/this-might-be-our-first-look-at-nintendo-s-next-ha-31239919/, Available as Early as May 1, 2014, Retrieved May 2, 2015, 15 pages.
"The Scuf One Has Arrived—The Best of Both Worlds," ScufGaming Website, Available Online at http://scufgaming.com/controllers/scuf-one-xbox-one/features/, Available as Early as Jun. 25, 2014, Retrieved Apr. 2, 2015, 18 pages.
"Modular Gamepad: swappable controls, any console," Hackaday.io Website, Available Online at hackaday.io/project/2782-modular-gamepad-swappable-controls-any-console, Aug. 21, 2014, 9 pages.
M.L., R., "Rat Pro X Gaming Mouse Boasts Swappable Sensors," InventorSpot Website, Available Online at inventorspot.com/articles/rat-pro-x-gaming-mouse-boasts-swappable-sensors, Available as Early as Jan. 28, 2015, Retrieved Mar. 26, 2015, 5 pages.
"Noire Xbox One rocker rocker handle cap cap xbox one rocker cover TPU protective cap," AgreeTao Website, Available Online at www.agreetao/taobao/view/id/38285531788, Available as Early as Feb. 1, 2015, Retrieved May 2, 2015, 7 pages.
"Official Controller Discussion", Retrieved from https://web.archive.org/web/20160518033323/http://fps247.com/threads/official-controller-discussion.94509/, Dec. 20, 2014, 16 Pages.
"Aim Controllers PS4", Retrieved from https://twitter.com/aimcontrollerss?lang=en, Sep. 4, 2014, 2 Pages.

* cited by examiner

ID
GAME CONTROLLER WITH REMOVABLE TRIGGER ACCESSORY

CROSS REFERENCE TO RELATED APPLICATIONS

This application claims priority to U.S. Provisional Patent Application No. 62/173,303, filed Jun. 9, 2015, the entirety of which is hereby incorporated herein by reference.

BACKGROUND

A user input control device, such as a game controller may be used to provide user input to control an object or a character in a video game or to provide some other form of control. A game controller may include various types of controls that may be configured to be manipulated by a finger to provide different types of user input. Non-limiting examples of such controls may include push buttons, triggers, touch pads, joysticks, paddles, bumpers, and directional pads. The various controls may be manipulated to provide control signals that may be mapped to different operations in a video game.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A game controller includes a trigger-activation sensor, a sensor-activation feature, and a trigger-retention feature. The sensor-activation feature is moveable relative to the trigger-activation sensor. The trigger-activation sensor outputs a control signal based on a relative position of the sensor-activation feature and the trigger-activation sensor. The trigger-retention feature is configured to removably affix a selected removable trigger accessory to the game controller. The selected removable trigger accessory is one of a plurality of differently configured removable trigger accessories removably affixable to the game controller. The selected removable trigger accessory is configured to change the relative position of the sensor-activation feature and the trigger-activation sensor based on finger manipulation of the selected removable trigger accessory when the selected removable trigger accessory is removably affixed to the game controller.

DETAILED DESCRIPTION

User input control devices, such as game controllers, may be shaped/sized to fit an average hand size of a population of users. Likewise, finger-manipulatable controls (e.g., push buttons, triggers, joysticks, directional pads) that are integral to a game controller have traditionally been designed according to a "one size fits all" approach. However, different users may have different preferences on the shape, size, color, texture, or other attributes of such controls.

The present disclosure is directed to a customizable game controller that includes one or more differently configured trigger-type controls that can be swapped out in a tool-free manner. A trigger-type control may be any suitable control that is movable in a particular direction to generate a control signal based on a relative position of the trigger-type control in that direction. For example, differently configured removable trigger accessories may have different sizes, materials, ranges of motion, spring tensions, pull weights, and/or finger positions. In one example, such a configuration facilitates the use of differently configured removable trigger accessories that are customized for particular types of video games to be quickly swapped on the game controller when switching between playing different video games. In another example, such a configuration may facilitate the use of differently configured removable trigger accessories that are preferred by different players to be quickly swapped on the game controller when the game controller is used by the different players.

Figure 1:
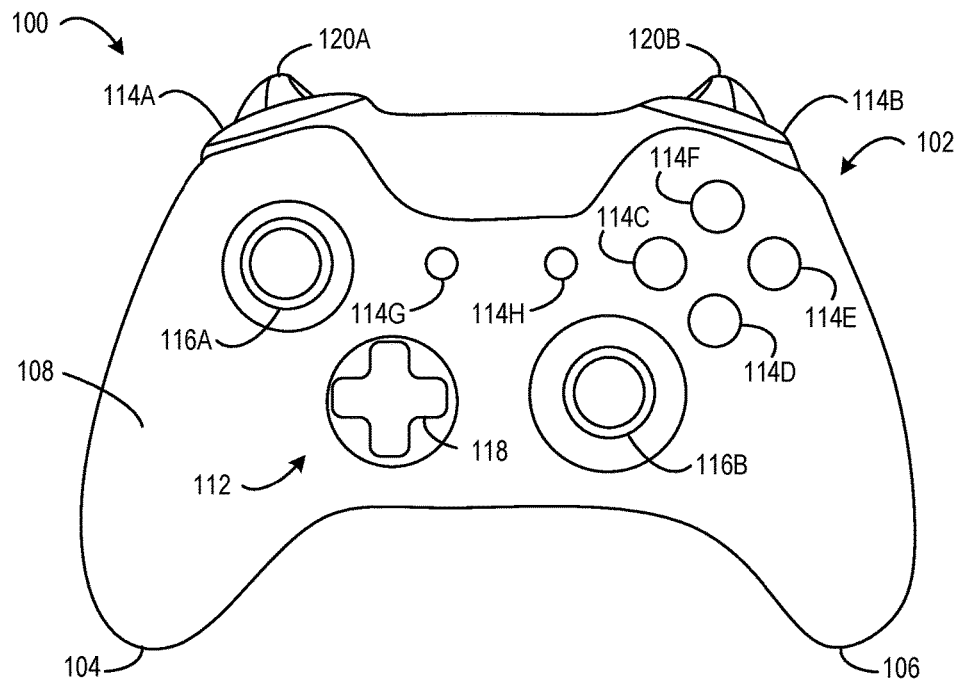
FIG. 1 shows a front of a game controller with a plurality of removable trigger accessories removably affixed to the game controller.
Figure 2:
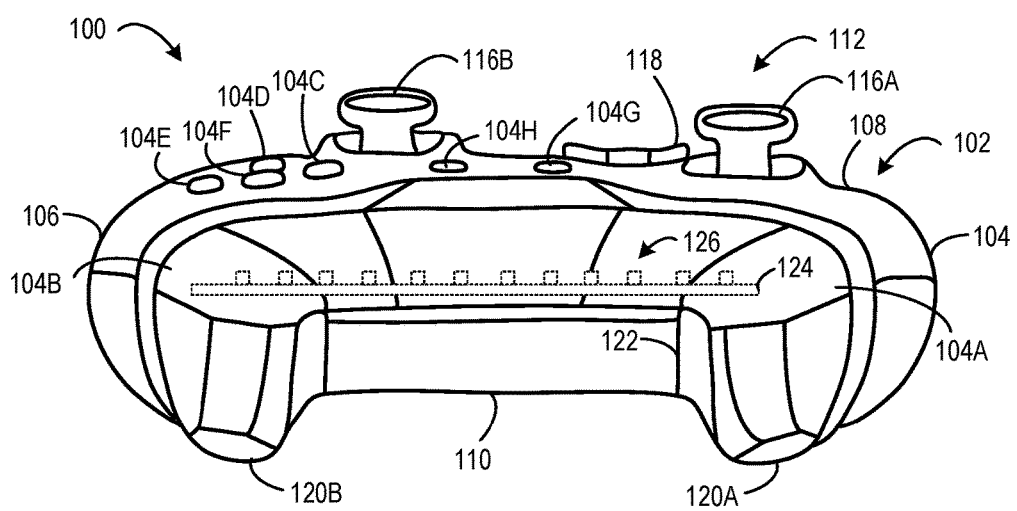
FIG. 2 shows a top of the game controller of FIG. 1 with the plurality of removable trigger accessories removably affixed to the game controller.

FIGS. 1 and 2 show an example user input control device in the form of a game controller 100. The game controller 100 may be configured to translate user input into control signals that are provided to a computing device, such as a gaming console. The control signals may be mapped to commands to control a video game or perform other operations. For example, the game controller 100 may be configured to send control signals via a wired or wireless connection with a computing device.

The game controller 100 includes a grip 102 configured to be held with two hands. As such, the grip 102 includes a left-hand portion 104 configured to be gripped by a left hand and a right-hand portion 106 configured to be gripped by a right hand. The right-hand portion 106 may oppose the left-hand portion 104. When a user holds the controller 100 with two hands such that the left hand grips the left-hand portion 104 and the right hand grips the right-hand portion 106, the user's thumbs may naturally interface with a thumb-side 108 of the grip 102. Further, the user's fingers other than the thumb (e.g., at least a ring finger and a pinky finger) may interface with a finger-side 110 of the grip 102.

The game controller 100 includes a plurality of controls 112 configured to generate different control signals responsive to finger manipulation. In the depicted implementation, the plurality of controls 112 includes a plurality of action buttons 114 (e.g., 114A, 114B, 114C, 114D, 114E, 114F, 114G, and 114H), a plurality of joysticks 116 (e.g., a left joystick 116A and a right joystick 116B), a directional pad 118, and a plurality of triggers 120 (e.g., a left trigger 120A and a right trigger 120B). A majority of the controls 112 are positioned on the thumb-side 108 of the game controller 100 As such, the plurality of controls 112 typically may be manipulated by a user's thumbs. The plurality of triggers 120 are positioned on a side 122 intermediate the thumb-side 108 and the finger-side 110 and oriented non-parallel to the thumb-side 108 and the finger-side 110 to allow the triggers 120 to be manipulated by index fingers and/or middle fingers when a user grips the game controller 100 with two hands. In some cases, a user may manipulate one or more of the plurality of controls 112 according to another hand configuration. The game controller 100 may include any suitable number of controls. The game controller 100 may include any suitable type of controls.

In the illustrated implementation, the game controller 100 includes a printed circuit board 124 located in an interior of the grip 102. The printed circuit board 124 may include a plurality of control-activation sensors 126. The plurality of control-activation sensors 126 may correspond to the plurality of controls 112. In particular, each control-activation sensor may be configured to generate a control signal responsive to interaction with a corresponding control.

In one example, each of the plurality of action buttons 114 may be configured to activate a corresponding button-activation sensor to generate a control signal responsive to being depressed (e.g., via finger manipulation). In another example, each of the plurality of joysticks 116 may interact with joystick-activation sensors in the form of potentiometers that use continuous electrical activity to provide an analog input control signal based on a position of the joystick in relation to a default "center" position. In another example, the directional pad 118 may be configured to activate different directional pad-activation sensors corresponding to different directions (e.g., up, down, left, right) responsive to the directional pad being depressed in the different directions. In another example, each of the triggers 120 may be configured to interact with a trigger-activation sensor to provide a variable control signal based on a position of the trigger relative to a default position. For example, as a trigger is pulled farther away from the default position, a characteristic of the generated control signal may increase in magnitude.

Non-limiting examples of control-activation sensors may include dome switches, tactile switches, potentiometers, Hall Effect sensors, and other electronic sensing components. The game controller 100 may include any suitable number of control-activation sensors. The game controller 100 may include any suitable type of control-activation sensors. In some implementations, one or more control-activation sensors may be independent of any printed circuit board.

Each of the triggers 120 may be one of a plurality of differently configured removable trigger accessories removably affixable to the game controller 100. For example, various differently configured removable trigger accessories may have different sizes, shapes, textured surfaces, materials, and/or other features that are preferred by different users or may be suited for particular gaming or other purposes.

In some implementations, one or more of the plurality of controls 112 other than the triggers 120 also may be removably affixable to the game controller 100.

Figure 3:
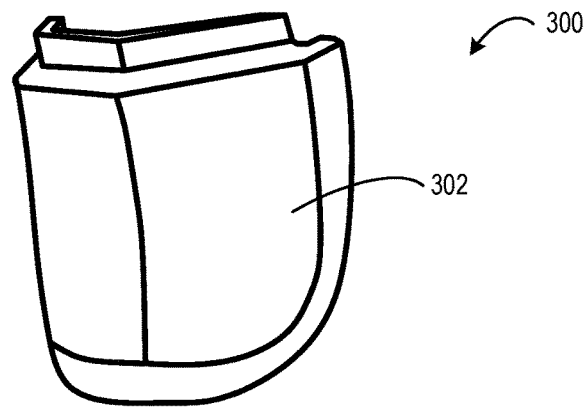
FIG. 3 shows a front of a removable trigger accessory.
Figure 4:
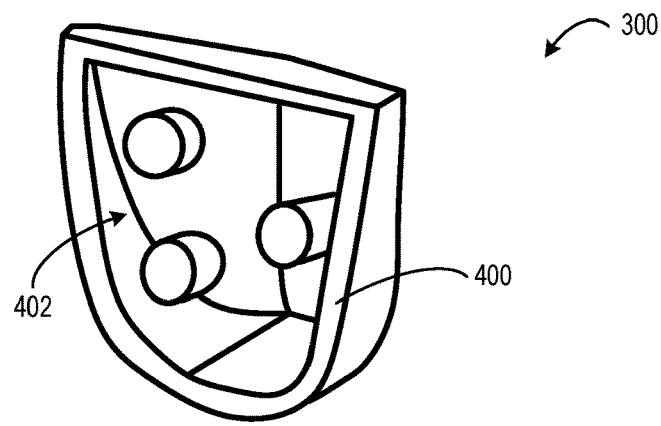
FIG. 4 show a rear of the removable trigger accessory of FIG. 3.
Figure 5:
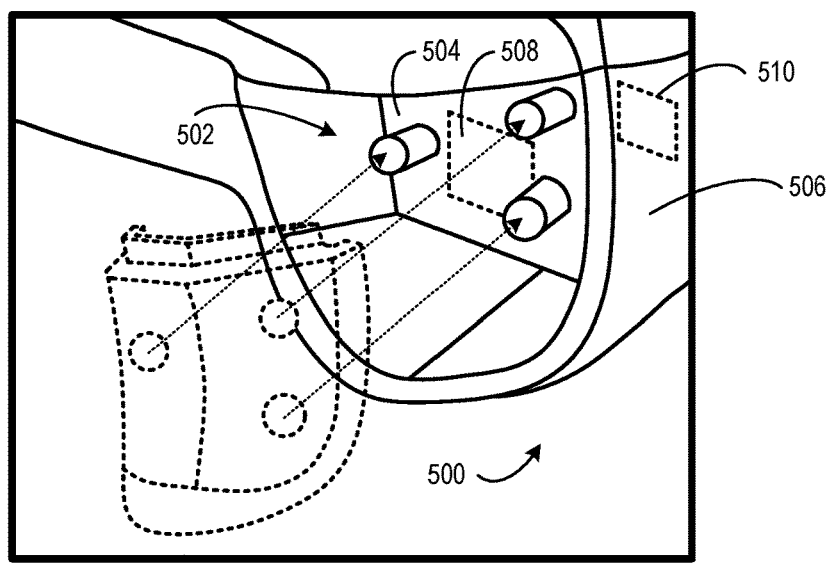
FIG. 5 shows a game controller including a magnetic trigger-retention feature configured to removably affix the removable trigger accessory of FIGS. 3-4.

FIGS. 3-5 show a removable trigger accessory 300 configured to magnetically affix to a game controller 500. FIG. 3 shows an exterior side 302 of the removable trigger accessory 300. The exterior side 302 may be contoured to fit a user's finger. In the depicted example, the exterior side 302 forms a ramp that extends downward and outward towards a bottom end of the removable trigger accessory 300. The ramp may aid a user in precisely adjusting a position of the removable trigger accessory 300 when the removable trigger accessory 300 is removably affixed to the game controller 500. The exterior side 302 may include any suitable surface, feature, shape, material, texture, and/or structure configured to be touched and/or manually manipulated by a finger to provide user input.

FIG. 4 shows an interior side 400 of the removable trigger accessory 300. The interior side 400 includes a mounting interface 402 configured to interface with a trigger-retention feature 502 (shown in FIG. 5) of the game controller 500 to removably affix the removable trigger accessory 300 to the game controller 500. In the depicted example, the mounting interface 402 includes three magnetic posts arranged to form a mounting interface with the trigger-retention feature 502.

FIG. 5 shows the trigger-retention feature 502 depicted in the form of three magnetic posts formed on a mounting platform 504 of the game controller 500. In particular, the mounting platform 504 and three magnetic posts of the trigger-retention feature 502 may be recessed within a grip 506 of the game controller 500. The three magnetic posts of the trigger-retention feature 502 may be arranged to align with the three magnetic posts of the mounting interface 402.

The mounting interface 402 may include any suitable surface, feature, shape, and/or structure configured to selectively mate with the trigger-retention feature 502 to removably affix the removable trigger accessory 300 to the game controller 500. In some implementations, the mounting interface 402 of the removable trigger accessory 300 may have a shape that complements a shape of the trigger-retention feature 502. Such corresponding interfaces may aid the removable trigger accessory 300 in aligning with the trigger-retention feature 502 to removably affix the removable trigger accessory 300 to the game controller 500.

The removable trigger accessory 300 may be configured to removably affix to the game controller 500 through a magnetic attraction. For example, the three posts of the trigger-retention feature 502 may be magnets and the three corresponding posts of the mounting interface 402 may be made of ferromagnetic material. Accordingly, the removable trigger accessory 300 may be removably affixable to the game controller 500 through a magnetic attraction between the magnets of the trigger-retention feature and the ferromagnetic material of the mounting interface.

In some implementations, the removable trigger accessory 300 may be a single ferromagnetic metal part. For example, the metal part may be metal injection-molded. In another example, the part may be machined from a single piece of metal. In other implementations, the removable trigger accessory 300 may be an assembly including one or more ferromagnetic parts. For example, the three posts of the mounting interface 402 may be ferromagnetic material that is bonded to a plastic faceplate.

In some implementations, the three posts of the trigger-retention feature 502 may be made of ferromagnetic material and the three corresponding posts of the mounting interface 402 may be magnets. Accordingly, the removable trigger accessory 300 may be removably affixable to the game controller 500 through a magnetic attraction between the magnets of the mounting interface and the ferromagnetic material of the trigger retention feature.

The mounting interface 402 and/or the trigger-retention feature 502 may include any suitable number of cooperating magnets and/or pieces of ferromagnetic material. Further, such magnets and/or pieces of ferromagnetic material may take any suitable form.

When the removable trigger accessory 300 is removably affixed to the game controller 500, the removably trigger accessory 300 may appear as if integrated or permanently installed in the game controller 500. The removable trigger accessory 300 may be configured to reside in a default posture when no touch force is applied to the removable trigger accessory 300. Further, the removable trigger accessory 300 may be configured to move from the default posture based on finger manipulation.

When the removable trigger accessory 300 is removably affixed to the game controller 500, the removable trigger accessory 300 may be configured to change a position of the mounting platform 504 based on finger manipulation of the removable trigger accessory 300. In particular, the mounting platform 504 may move further into an interior of the grip 506 when the removable trigger accessory 300 is depressed. A sensor-activation feature 508 may be positioned on an opposing side of the mounting platform 504 relative to the three posts of the trigger-retention feature 502. When the mounting platform 504 moves into the interior of the grip 102, a relative position of the sensor-activation feature 508 and a trigger-activation sensor 510 may change. The trigger-activation sensor 510 may output a control signal that is based on the relative position of the sensor-activation feature 508 and the trigger-activation sensor 510. In one example, the sensor-activation feature 508 includes a magnet and the trigger-activation sensor 510 is a Hall Effect sensor configured to vary an output signal based on the magnetic field produced by the magnet. The magnetic field as detected by the Hall Effect sensor may vary based on the relative position and/or orientation of the magnet and the Hall Effect sensor. The control signal produced by the trigger-activation sensor 510 may be any signal that differs from a signal or lack thereof produced by the trigger-activation sensor 510 when the removable trigger accessory 300 is in the default posture.

The removable trigger accessory 300 is one of a plurality of differently configured removable trigger accessories that may be removably affixable to the trigger-retention feature 502 of the game controller 500 through a magnetic attraction between the mounting interface 402 and the trigger-retention feature 502.

Figure 6:
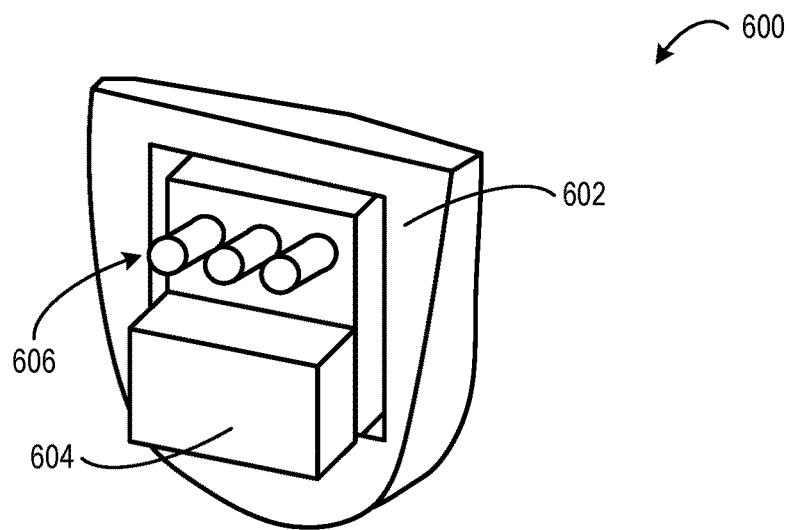
FIG. 6 shows a removable trigger accessory including an electronic module.
Figure 7:
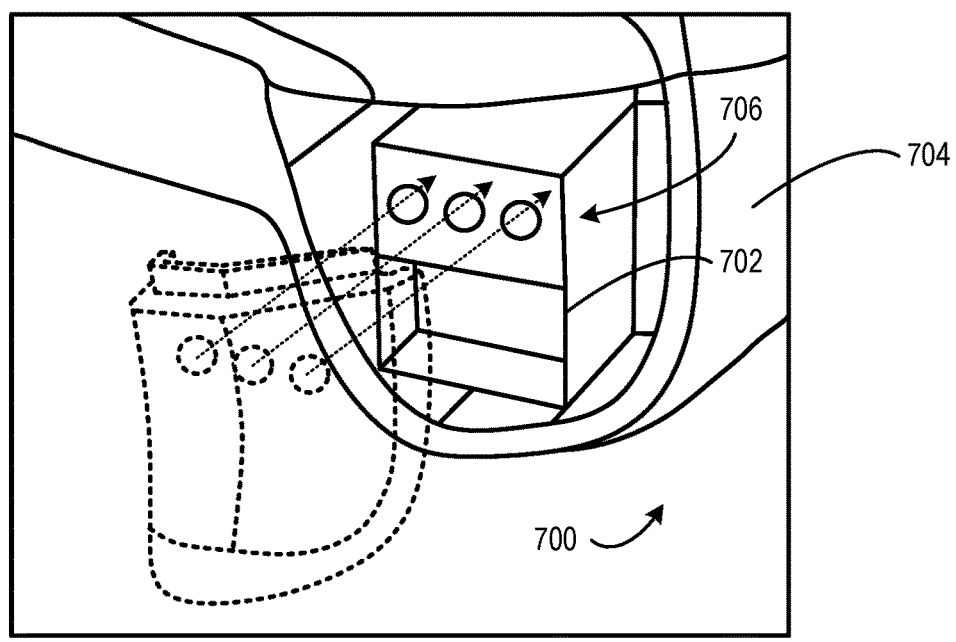
FIG. 7 shows a game controller including an outlet configured to connect with the electronic module of FIG. 6.
Figure 8:
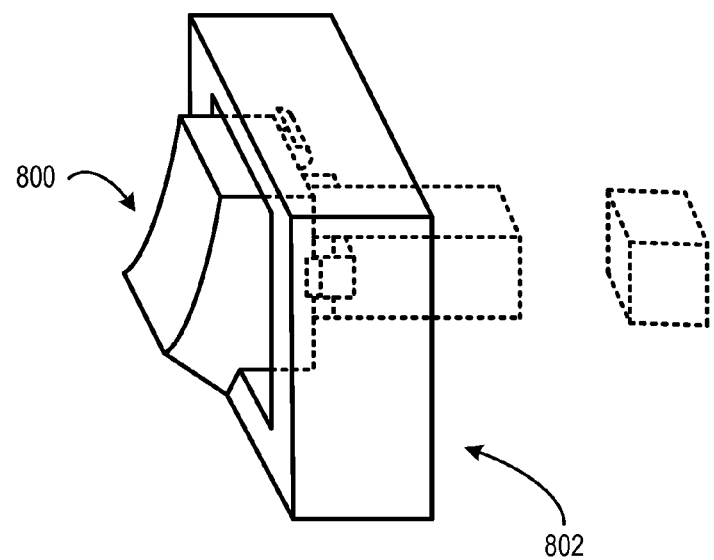
FIG. 8 shows a removable trigger accessory removably affixed to a game controller via a mechanical trigger-retention features of the game controller.

FIGS. 6-7 show a removable trigger accessory 600 configured to electrically connect with a trigger-retention feature 702 of the game controller 700. FIG. 6 shows the interior side 602 of the removable trigger accessory 600 that contains an electronic module 604. The electronic module 604 includes a mounting interface configured to interface with a trigger-retention feature 702 (shown in FIG. 7) of the game controller 700 to removably affix the removable trigger accessory 600 to the game controller 700. In the depicted example, the mounting interface includes three male electrical contacts 606 that protrude from the electronic module 604.

FIG. 7 shows a trigger-retention feature of the game controller 700 depicted in the form of an outlet 702. The outlet 702 may be recessed within a grip 704 of the game controller 700. The outlet 702 includes three female electrical contacts 706 arranged to align with the three male electrical contacts 606 of the electronic module 604 of the removable trigger accessory 600. The interface between the male electrical contacts 606 of the electronic module 604 and the female electrical contacts 706 of the outlet 702 may provide an electrical and mechanical connection between the removable trigger accessory 600 and the game controller 700. The electronic module 604 may electrically and/or mechanically connect with the outlet 702 in any suitable manner. In some implementations, the trigger-retention feature and/or the removable trigger accessory may include additional magnetic and/or mechanical interfaces to removably affix the removable trigger accessory 600 to the game controller 700.

The electronic module 604 may be configured to perform any suitable operation that uses energy provided by the game controller 700 or that provides energy to the game controller 700 through the electrical connection between the electronic module 604 and the outlet 702. The electronic module 604 may include any suitable electronic componentry including, but not limited to, a linear force reactor, a haptic feedback motor, LEDs or other lights, a speaker, a buzzer, a shock device, a heater, a Peltier cooler, a balanced motor for a gyroscope, and a battery.

In some implementations, the electronic module 604 may be permanently attached to the removable trigger accessory 600. In some such implementations, differently configured removable trigger accessories may include differently configured electronic modules. For example, a removable trigger accessory including a haptic feedback motor may be swapped on the game controller for a different removable accessory having flashing LEDs. In other implementations, the electronic module 604 may be removable from the removable trigger accessory 600. In some such implementations, differently configured electronic modules may be swapped out of the same removable trigger accessory 600 that is removably affixable to the game controller 700.

In some implementations, in addition to the outlet 702, the game controller 700 may include mechanical and/or magnetic trigger-retention features configured to removably affix the removable trigger accessory 600 to the game controller 700. Likewise, the removable trigger accessory 600 may include cooperating mechanical and/or magnetic mounting interfaces configured to removably affix the removable trigger accessory 600 to the game controller 700.

FIGS. 8-13 show a removable trigger accessory 800 configured to removably affix to a game controller 802 through a mechanical connection. The game controller 802 includes a plurality of mechanical trigger-retention features in the form of a mating slot 804 (shown in FIG. 11) and a male buckle portion 806 (shown in FIG. 9). Further, the removable trigger accessory 800 includes a hook 808 (shown in FIG. 11) and a female buckle portion 810 (shown in FIG. 9). The hook 808 may be configured to engage the mating slot 804 and the female buckle portion 810 may be configured to engage the male buckle portion 806 to removably affix the removable trigger accessory 800 to the game controller 802.

Figure 9:
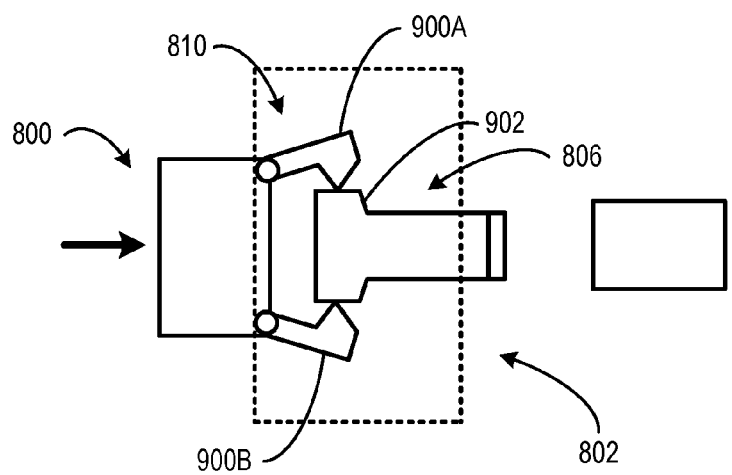
FIG. 9 shows a top view of the removable trigger accessory of FIG. 8 being installed on mechanical trigger-retention features of the game controller.

FIG. 9 shows the female buckle portion 810 of the removable trigger accessory 800 being pressed on to the male buckle portion 806 to removably affix the removable trigger accessory 800 to the game controller 802. The female buckle portion 810 may include two compliant spurs 900 (900A, 900B) that bend around a head 902 of the male buckle portion 806 when the removable trigger accessory 800 is pressed on to the male buckle portion 806. Each spur 900 may include an angled interior surface that interfaces with the head 902 to aid the spur 900 in sliding around the head 902. In some implementations, additionally or alternatively, the spurs 900 may be hinged and may rotate to move around the head 902 of the male buckle portion 806.

Figure 10:
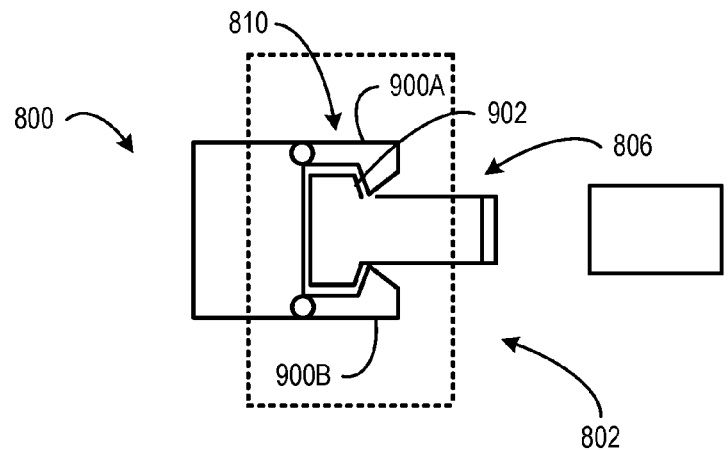
FIG. 10 shows a top view of the removable trigger accessory of FIG. 8 fully installed on the mechanical trigger-retention features of the game controller.

FIG. 10 shows the female buckle portion 810 of the removable trigger accessory 800 fully installed on to the male buckle portion 806. In particular, the spurs 900 of the female buckle portion 810 have cleared the head 902 of the male buckle portion 806, so that the head 902 mechanically retains the spurs 900 to removably affix the removable trigger accessory 800 to the game controller 802. Further, a back side of the head 902 may include angled surfaces that interface with the spurs 900 to aid the spurs 900 in sliding back around the head 902 when the removable trigger accessory 800 is removed from the game controller 802. In other words, the male buckle portion 806 may act like a barbless hook that allows the female buckle portion 810 to slip on and off.

Figure 11:
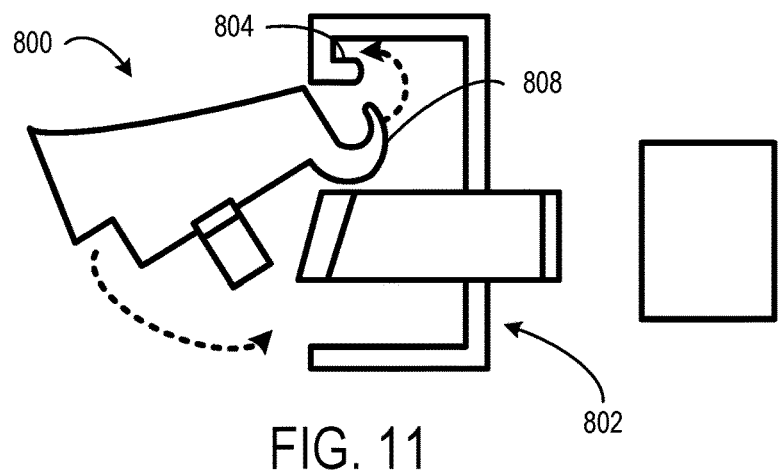
FIG. 11 shows a side view of the removable trigger accessory of FIG. 8 being installed on mechanical trigger-retention features of the game controller.
Figure 12:
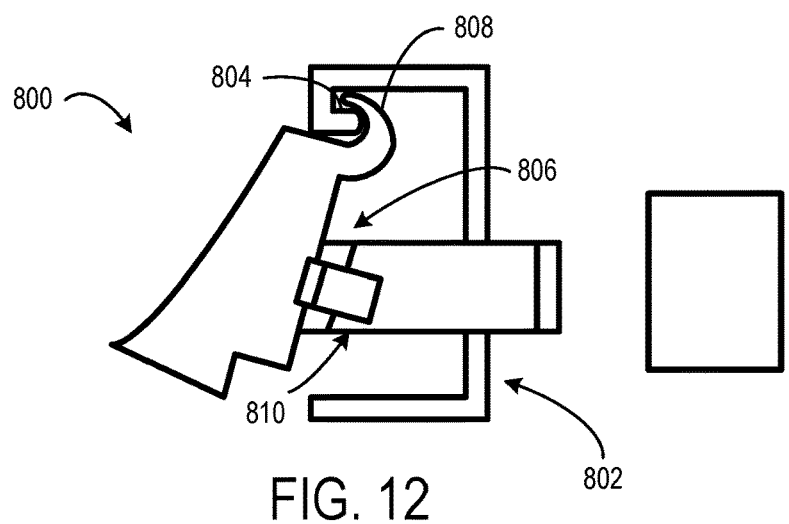
FIG. 12 shows a side view of the removable trigger accessory of FIG. 8 fully installed on mechanical trigger-retention features of the game controller.

FIG. 11 shows the removable trigger accessory 800 oriented to be installed on the game controller 802. In particular, the removable trigger accessory 800 may be rotated to allow the hook 808 to be inserted into an interior of the game controller 802 far enough to clear the mating slot 804. As shown in FIG. 12, once the hook 808 has cleared the mating slot 804, the removable trigger accessory 800 may be rotated so that the hook 808 engages the mating slot 804 to mechanically affix the removable trigger accessory 800 to the game controller 802. Furthermore, when the removable trigger accessory 800 is rotated, the female buckle portion 810 may mechanically engage the male buckle portion 806.

Figure 13:
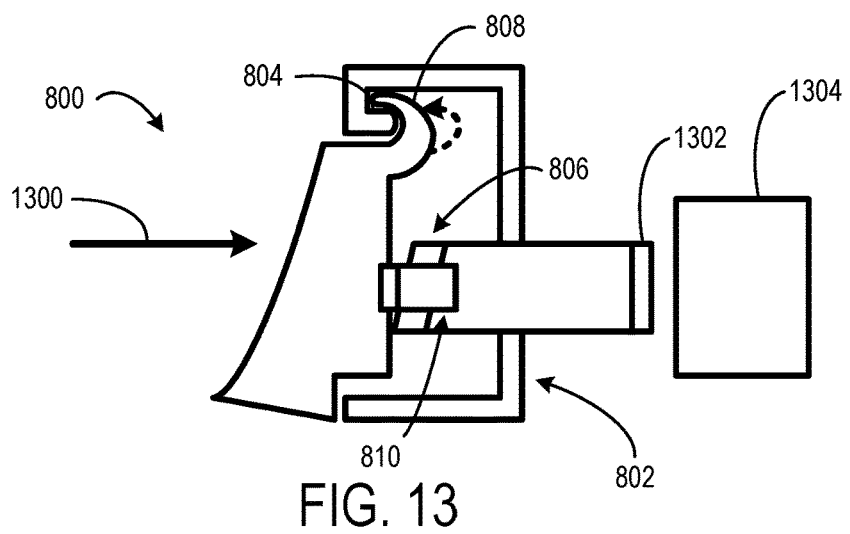
FIG. 13 shows a side view of the removable trigger accessory of FIG. 8 changing a relative position of a sensor-activation feature and a trigger-activation sensor of the game controller based on finger manipulation of the removable trigger accessory.

FIG. 13 shows the removable trigger accessory 800 being manipulated by a touch force 1300 when the removable trigger accessory 800 is removably affixed to the game controller 802. In particular, the hook 808 and the mating slot 804 collectively form a pivot, and the removable trigger accessory 800 is configured to rotate about the pivot based on the touch force 1300. An amount of rotation of the removable trigger accessory 800 may correspond to a magnitude of the touch force 1300 applied to the removable trigger accessory 800.

Furthermore, the game controller 802 includes a sensor-activation feature 1302 that is positioned on an interior side of the male buckle portion 806. The sensor-activation feature 1302 may be moveable relative to a trigger-activation sensor 1304. In particular, when the removable trigger accessory 800 rotates based on the touch force 1300, the removable trigger accessory 800 changes the relative position of the sensor-activation feature 1302 and trigger-activation sensor 1304 (e.g., the sensor-activation feature 1302 moves closer to the trigger-activation sensor 1304). The trigger-activation sensor 1304 may output a control signal based on a relative position of the sensor-activation feature 1302 and the trigger-activation sensor 1304. In other implementations, the sensor-activation feature 1302 may be attached to the removable trigger accessory 800.

The removable trigger accessory 800 may be mechanically affixed to the game controller 802 via any suitable number and/or type of mechanical trigger-retention feature(s). For example, such mechanical trigger-retention features may include, but are not limited to, posts, holds, sockets, snaps, latches, pins, and buttons.

In configurations where a removable trigger accessory rotates based on finger manipulation, there is a possibility that the removable trigger accessory may become unintentionally detached from the game controller. However, in the configuration described above, by employing two separate mechanical trigger-retention features that are spaced apart from one another, the removable trigger accessory may be less likely to become unintentionally detached from the game controller relative to a configuration having a single mechanical attachment.

Figure 14:
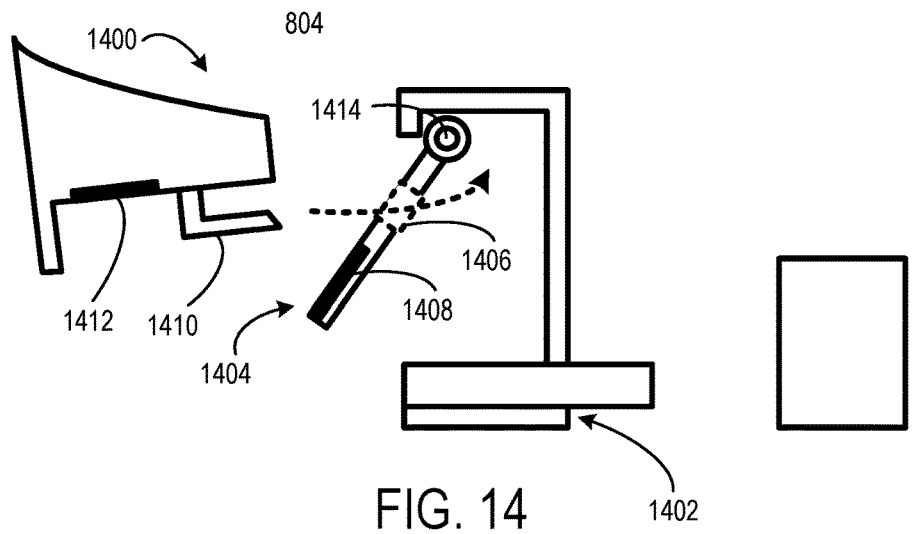
FIG. 14 shows a removable trigger accessory being installed on a magnetic trigger-retention feature and a mechanical trigger-retention feature of a game controller.
Figure 15:
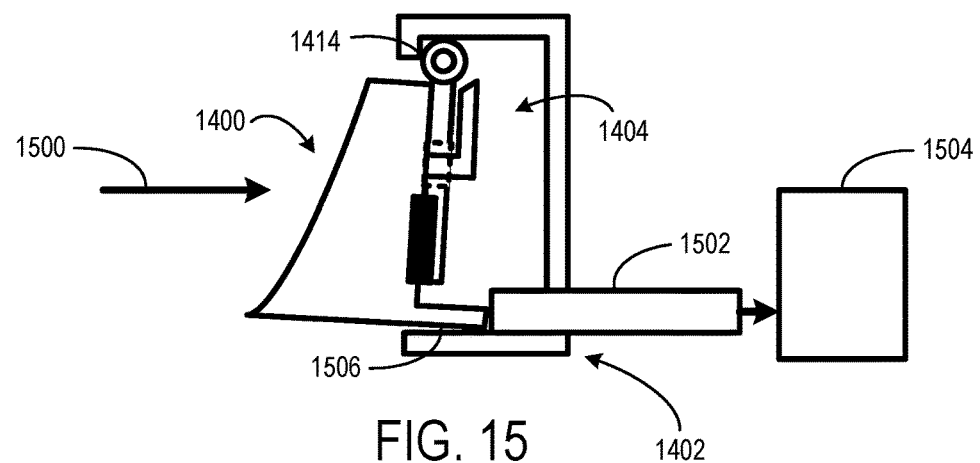
FIG. 15 shows the removable trigger accessory of FIG. 14 changing a relative position of a sensor-activation feature and a trigger-activation sensor of the game controller based on finger manipulation of the removable trigger accessory.
Figure 16:
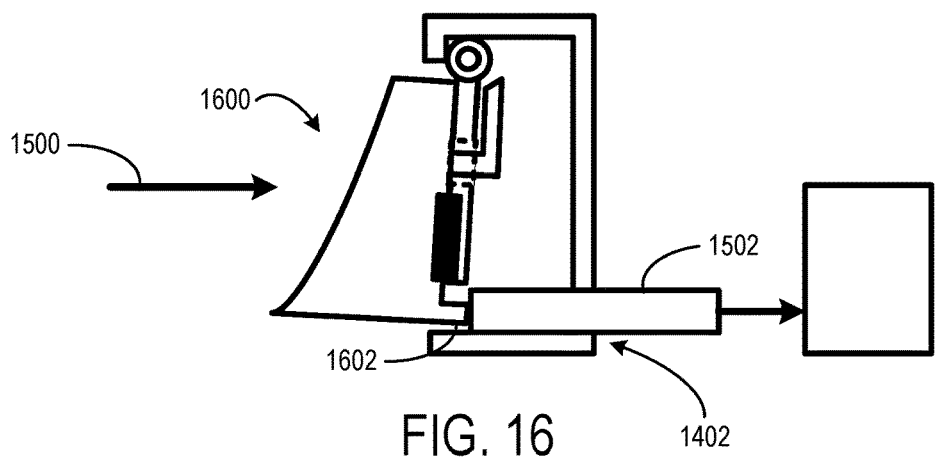
FIG. 16 shows a removable trigger accessory having a different range of motion adjuster than the removable trigger accessory of FIG. 14.

FIGS. 14-16 show a removable trigger accessory 1400 configured to removably affix to a game controller 1402 through a mechanical connection as well as a magnetic connection. The game controller 1402 includes a mounting platform 1404 including a mechanical trigger-retention feature in the form of a mating slot 1406 and magnetic trigger-retention feature in the form of a magnet 1408. The mating slot 1406 may be centrally located on the mounting platform 1404. The magnet 1408 is positioned on a lower portion of the mounting platform 1404. The magnet 1408 may be attached to the mounting platform 1404 in any suitable manner. For example, the magnet 1408 may be attached to the mounting platform 1404 via an adhesive. In some implementations, the magnet 1408 may be alternatively positioned on an upper portion of the mounting platform 1404 above the mating slot 1406. In some implementations, a second magnet may be positioned on the upper portion of the mounting platform 1404 above the mating slot 1406.

The removable trigger accessory 1400 includes a hook 1410 and a piece of ferromagnetic material 1412. The hook 1410 may be configured to engage the mating slot 1406 and the piece of ferromagnetic material 1412 may be configured to be magnetically attracted to the magnet 1408 to removably affix the removable trigger accessory 1400 to the game controller 1402.

The mounting platform 1404 includes a pivot 1414 that allows the mounting platform 1404 to rotate the removable trigger accessory 1400 when the removable trigger accessory 1400 is removably affixed to the game controller 1402.

FIG. 14 shows the removable trigger accessory 1400 oriented to be installed on the game controller 1402. In particular, the removable trigger accessory 1400 may be rotated to allow the hook 1410 to be inserted through the mating slot 1406. As shown in FIG. 13, once the hook 1410 has been inserted into the mating slot 1406, the removable trigger accessory 1400 may be rotated so that the piece of ferromagnetic material 1412 aligns with the magnet 1408 to mechanically and magnetically affix the removable trigger accessory 1400 to the game controller 1402.

FIG. 15 shows the removable trigger accessory 1400 being manipulated by a touch force 1500 when the removable trigger accessory 1400 is removably affixed to the game controller 1402. In particular, the mounting platform 1404 rotates about the pivot 1414 to change a position of the removable trigger accessory 1400. An amount of rotation of the pivot 1414 may correspond to a magnitude of the touch force 1500 applied to the removable trigger accessory 1400.

Furthermore, the game controller 1402 includes a sensor-activation feature 1502 that may be moveable relative to a trigger-activation sensor 1504. The removable trigger accessory 1400 includes a range of motion adjuster 1506 configured to adjust a range of motion of the sensor-activation feature 1502. As depicted, the range of motion adjuster 1506 is a pin that extends from a base of the removable trigger accessory 1400 into the interior of the game controller 1402 when the removable trigger accessory 1400 is removably affixed to the mounting platform 1404. The length of the pin may define a range of motion that the sensor-activation feature 1502 can travel. In particular, when the removable trigger accessory 1400 rotates based on the touch force 1500, the range of motion adjuster 1506 pushes the sensor-activation feature 1502 closer to the trigger-activation sensor 1504. When the removable trigger accessory 1400 has been fully rotated, the distance traveled by the sensor-activation feature 1502 may be the full range of motion as defined by the range of motion adjuster 1506. In other implementations, the sensor activation feature 1502 may be attached to the trigger accessory 1400 or the mounting platform 1404 and the motion adjuster 1506 may interface with another surface or component within the game controller 1402.

FIG. 16 shows a removable trigger accessory 1600 including a range of motion adjuster 1602 having a shorter pin relative to the range of motion adjuster 1506 of the removable trigger accessory 1400. Accordingly, when the removable trigger accessory 1600 is removably affixed to the game controller 1402 and when the same touch force 1500 is applied to the removable trigger accessory 1600 to fully rotate the removable trigger accessory 1600, the range of motion adjuster 1602 moves the sensor-activation feature 1502 a shorter travel distance relative to a travel distance of the sensor-activation feature 1502 as moved by the range of motion adjuster 1506. In other words, the range of motion adjuster 1602 may be configured to shorten a range of motion of the sensor-activation feature relative to the range of motion adjuster 1506 of the removable trigger accessory 1400.

A removable trigger accessory may include a range of motion adjuster configured to adjust a range of motion to any suitable range. Moreover, differently configured removable trigger accessories may include different range of motion adjusters configured to differently adjust a range of motion of a sensor-activation feature. Accordingly, different removable trigger accessories may be swapped on a game controller to change a range of motion of the trigger. For example, a removable trigger accessory having a range of motion adjuster that reduces a range of motion may be removably affixed to a game controller to play a first-person-shooter game, because the short range of motion may create a "hair trigger." On the other hand, a removable trigger accessory having a range of motion adjust that increases a range of motion may be removably affixed to the game controller to play a racing game where the trigger is used as a brake pedal in order to have precise braking of a race car.

Figure 17:
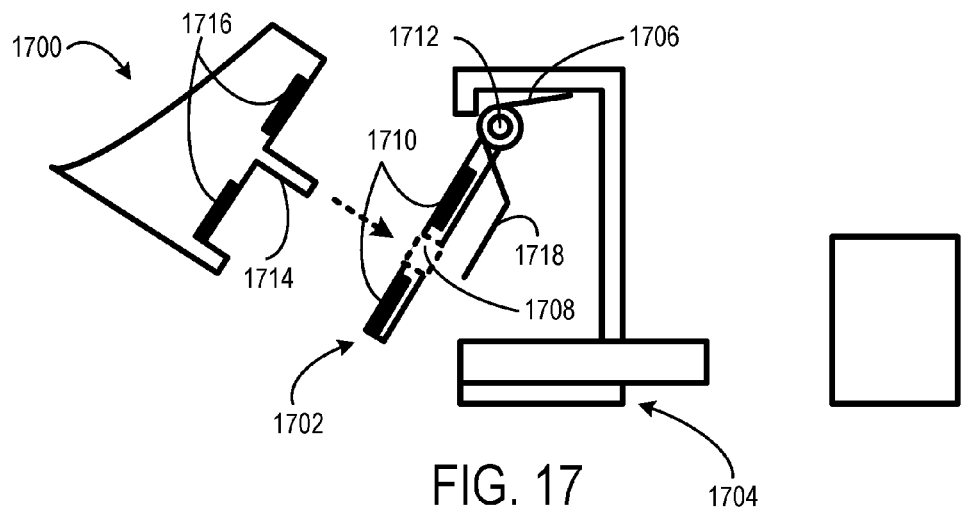
FIG. 17 shows a removable trigger accessory including a spring tensioner being installed on a magnetic trigger-retention feature of a game controller.
Figure 18:
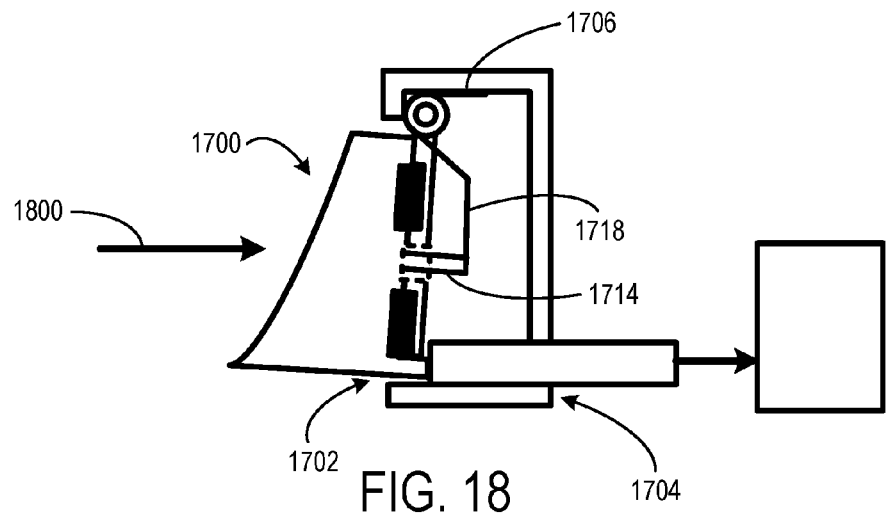
FIG. 18 shows the removable trigger accessory of FIG. 17 changing a relative position of a sensor-activation feature and a trigger-activation sensor of the game controller based on finger manipulation of the removable trigger accessory.
Figure 19:
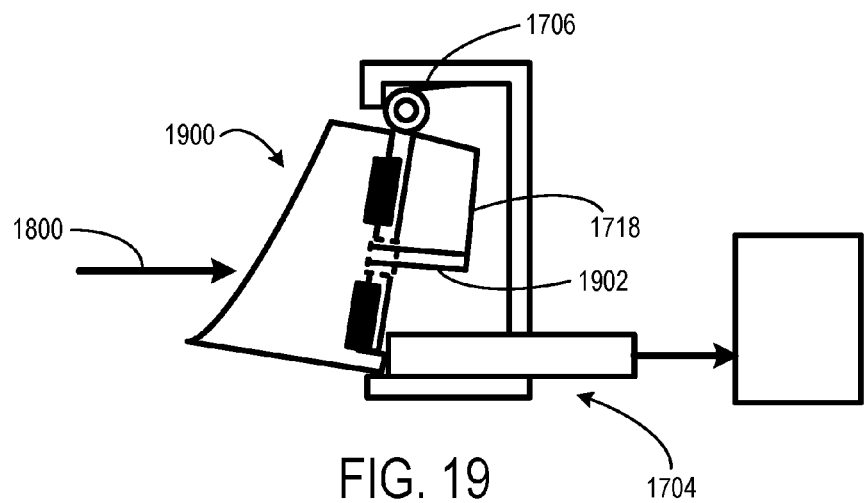
FIG. 19 shows a removable trigger accessory having a different spring tensioner than the removable trigger accessory of FIG. 17.

FIGS. 17-19 show a removable trigger accessory 1700 configured to removably affix to spring-loaded mounting platform 1702 of a game controller 1704 through a magnetic connection. The spring-loaded mounting platform 1702 may be biased by a torsion spring 1706 to maintain the mounting platform 1702 in a default posture. The mounting platform 1702 includes a slot 1708 and a pair of magnets 1710. The slot 1708 may be centrally located on the mounting platform 1702. The pair of magnets 1710 may be positioned above and below the slot 1708, respectively. The mounting platform 1702 includes a pivot 1712 that allows the mounting platform 1702 to rotate the removable trigger accessory 1700 when the removable trigger accessory 1700 is removably affixed to the game controller 1704.

The removable trigger accessory 1700 includes a spring tensioner 1714 and a pair of ferromagnetic pieces 1716. The spring tensioner 1714 may be configured to pass through the slot 1708 and interface with a receiver plate 1718 of the torsion spring 1706 to adjust an amount of spring force applied by the torsion spring 1706 to the mounting platform 1702. In particular, a length of the spring tensioner 1714 may define an amount of spring force applied by the torsion spring 1706 to the mounting platform 1702. The pair of ferromagnetic pieces 1716 may be configured to be magnetically attracted to the pair of magnets 1710 to removably affix the removable trigger accessory 1700 to the game controller 1704.

FIG. 18 shows the removable trigger accessory 1700 being manipulated by a touch force 1800 when the removable trigger accessory 1700 is removably affixed to the game controller 1704. In particular, the touch force 1800 is great enough to overcome the bias of the torsion spring 1706 to rotate the mounting platform 1702 about the pivot 1712 to change a position of the removable trigger accessory 1700. An amount of rotation of the pivot 1712 may correspond to a magnitude of the touch force 1800 relative to the spring force applied by the torsion spring 1706. When the touch force 1800 is no longer applied to the removable trigger accessory 1700, the torsion spring 1706 returns the mounting platform 1702 to the default posture.

FIG. 19 shows a removable trigger accessory 1900 including a spring tensioner 1902 having a longer pin relative to the spring tensioner 1714 of the removable trigger accessory 1700. In particular, the longer pin of the spring tensioner 1902 may apply a greater force to the receiver plate 1718 of the torsion spring 1706 of the game controller 1704 relative to the spring tensioner 1714 of the removable trigger accessory 1700. Accordingly, when the same touch force 1800 is applied to the removable trigger accessory 1900, the removable trigger accessory 1900 may travel a shorter distance relative to a travel distance of the removable trigger accessory 1700. In other words, a greater touch force may be required to cause the removable trigger accessory 1900 to travel a same distance as the removable trigger accessory 1700.

A removable trigger accessory may include a spring tensioner configured to adjust an amount of spring force applied by a spring to any suitable spring force. Moreover, differently configured removable trigger accessories may include different spring tensioners configured to differently adjust an amount of spring force applied by a spring. Accordingly, different removable trigger accessories may be swapped on a game controller to change a spring tension of a trigger. For example, a removable trigger accessory having a lesser spring tension may be removably affixed to a game controller to play a first-person-shooter game, because the less spring tension may allow for more rapid fire shooting. On the other hand, a removable trigger accessory having a greater spring tension may be removably affixed to the game controller to play a racing game where the trigger is used as a brake pedal in order to have precise braking of a race car.

Figure 20:
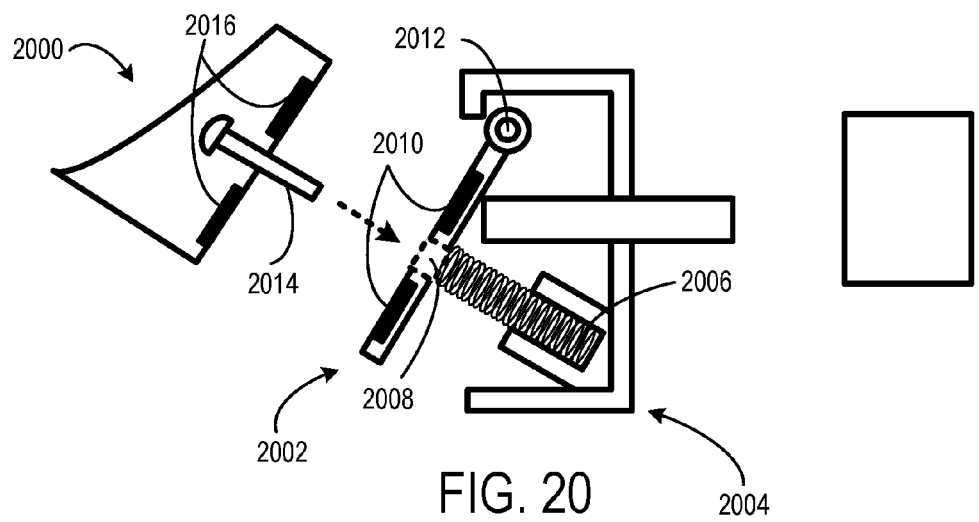
FIG. 20 shows a removable trigger accessory including an adjustable spring tensioner being installed on a magnetic trigger-retention feature of a game controller.
Figure 21:
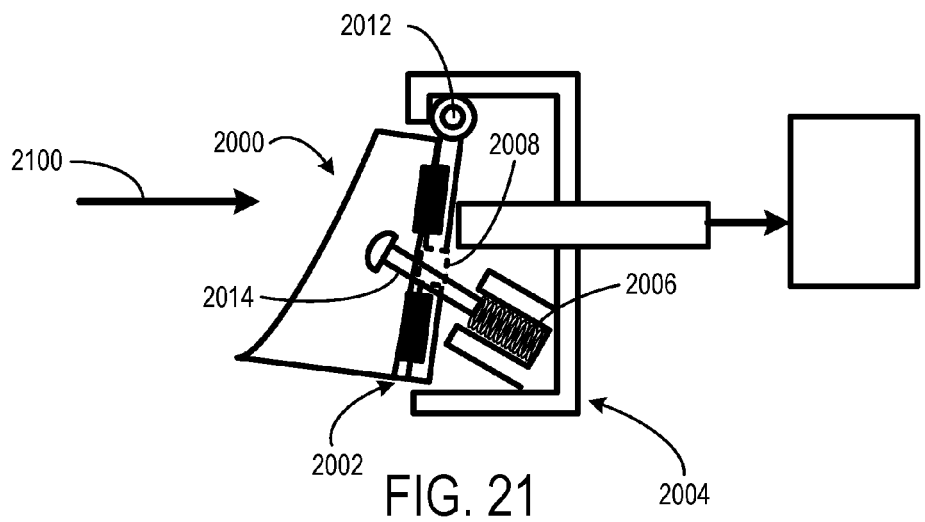
FIG. 21 shows the removable trigger accessory of FIG. 20 with the adjustable spring tensioner set to bias a spring with less spring force.
Figure 22:
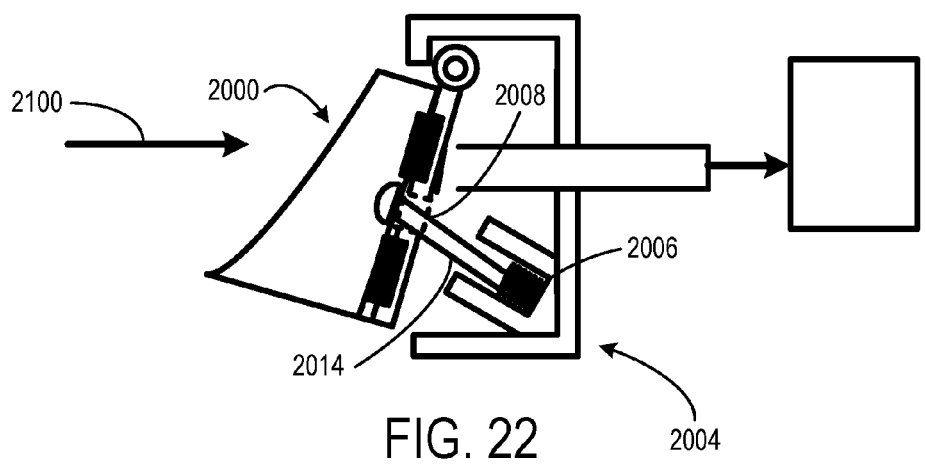
FIG. 22 shows the removable trigger accessory of FIG. 20 with the adjustable spring tensioner set to bias the spring with more spring force.

FIGS. 20-22 show a removable trigger accessory 2000 configured to removably affix to a spring-loaded mounting platform 2002 of a game controller 2004 through a magnetic connection. The spring-loaded mounting platform 2002 may be biased by a coil spring 2006 to maintain the mounting platform 2002 in a default posture. The mounting platform 2002 includes a slot 2008 and a pair of magnets 2010. The slot 2008 may be centrally located on the mounting platform 2002. The pair of magnets 2010 may be positioned above and below the slot 2008, respectively. The mounting platform 2002 includes a pivot 2012 that allows the mounting platform 2002 to rotate the removable trigger accessory 2000 when the removable trigger accessory 2000 is removably affixed to the game controller 2004.

The removable trigger accessory 2000 includes an adjustable spring tensioner 2014 and a pair of ferromagnetic pieces 2016. The adjustable spring tensioner 2014 may be configured to pass through the slot 2008 and interface with the coil spring 2006 to adjust an amount of spring force applied by the coil spring 2006 to the mounting platform 2002 via the adjustable spring tensioner 2014. In particular, a length of the adjustable spring tensioner 2014 may define an amount of spring force applied by the coil spring 2006 to the mounting platform 2002. In the depicted example, the adjustable spring tensioner 2014 is a set screw that is rotatable to adjust a length of a portion that passes through the slot 2008 and interfaces with the coil spring 2006. The pair of ferromagnetic pieces 2016 may be configured to be magnetically attracted to the pair of magnets 2010 to removably affix the removable trigger accessory 2000 to the game controller 2004.

FIG. 21 shows the removable trigger accessory 2000 being manipulated by a touch force 2100 when the removable trigger accessory 2000 is removably affixed to the game controller 2004. In particular, the touch force 2100 is great enough to overcome the bias of the coil spring 2006 to rotate the mounting platform 2002 about the pivot 2012 to change a position of the removable trigger accessory 2000. An amount of rotation of the pivot 2012 may correspond to a magnitude of the touch force 2100 relative to the spring force applied by the coil spring 2006 to the adjustable spring tensioner 2014. When the touch force 2100 is no longer applied to the removable trigger accessory 2000, the coil spring 2006 returns the mounting platform 2002 to the default posture.

FIG. 22 shows the removable trigger accessory 2000 with the adjustable spring tensioner 2014 adjusted to have a longer portion protrude through the slot 2008 relative to a length of the portion shown in FIG. 21. For example, the adjustable spring tensioner 2104 may be screwed in further to increase the length of the protruding portion. In particular, the longer portion of the adjustable spring tensioner 2014 applies a greater force to the coil spring 2006 relative to the amount of force applied by the adjustable spring tensioner 2014 as shown in FIG. 21. Accordingly, when the same touch force 2100 is applied to the removable trigger accessory 2000, the removable trigger accessory 2000 may travel a shorter distance relative to a travel distance of the removable trigger accessory 2000 when the set screw is screwed in to a lesser degree as shown in FIG. 21. In other words, a greater touch force may be required to cause the removable trigger accessory 2000 configured as shown in FIG. 22 to travel a same distance as the removable trigger accessory 2000 configured as shown in FIG. 21.

A removable trigger accessory may include an adjustable spring tensioner configured to adjust an amount of spring force applied by a spring to any suitable spring force. Moreover, an adjustable spring tensioner may adjust and amount of spring force applied by any suitable type of spring in any suitably manner.

Figure 23:
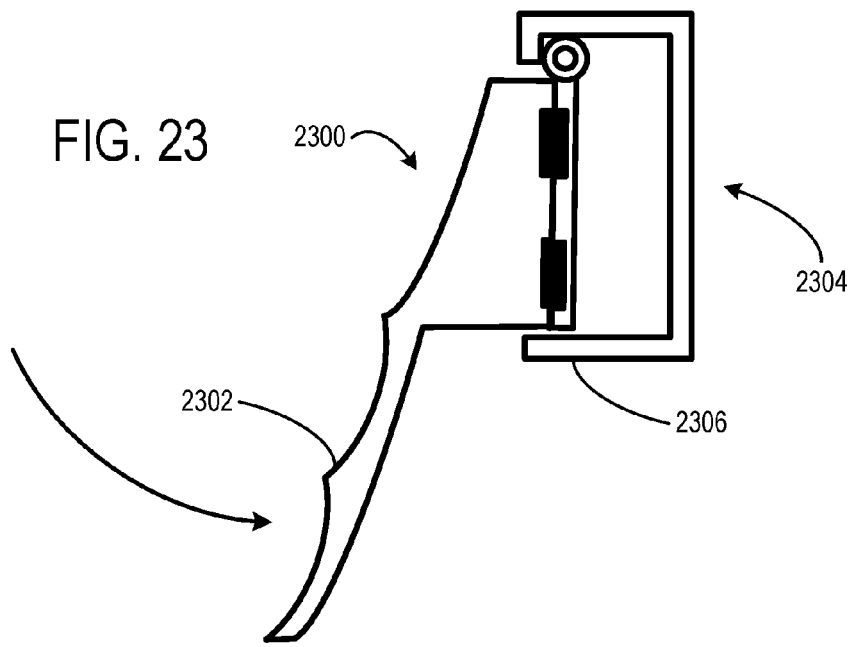
FIG. 23 shows a removable trigger accessory configured to be manipulated with two fingers.
Figure 24:
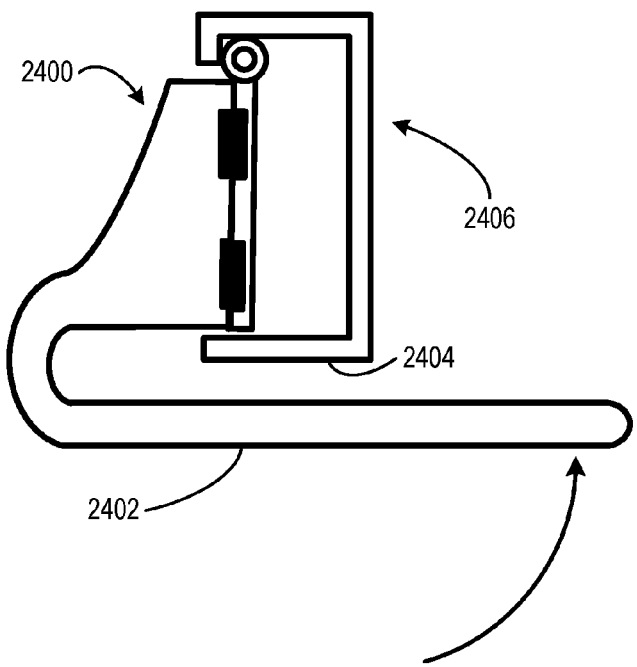
FIG. 24 shows a removable trigger accessory configured to wrap under a bottom of a game controller.
Figure 25:
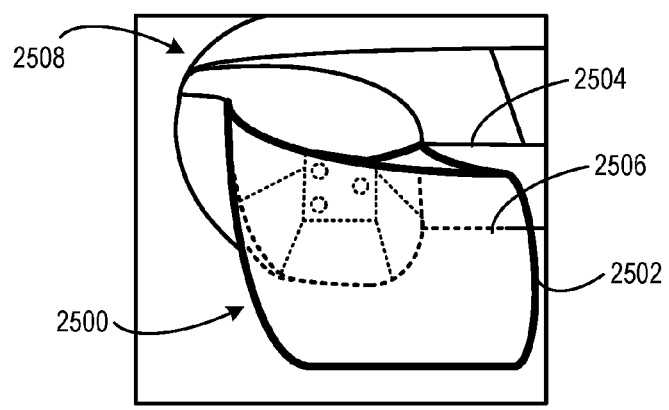
FIG. 25 shows a removable trigger accessory including an extra-large finger interface configured to extend both laterally along a front side of a game controller and longitudinally below a finger-side of the game controller.

FIGS. 23-25 show a plurality of differently configured removable trigger accessories having differently configured finger interfaces that enable different types of finger manipulation.

FIG. 23 shows a removable trigger accessory 2300 including a finger interface 2302 configured to accommodate two fingers in an over-under configuration. The removable trigger accessory 2300 is removable affixed to a game controller 2304. The finger interface 2302 is elongated to extend beyond a bottom or finger-side 2306 of the game controller 2304 when the removable trigger accessory 2300 is removably affixed to the game controller 2304. For example, the two finger over-under configuration of the finger interface 2302 may allow a user to manipulate the removable trigger accessory 2300 using an index finger and a middle finger. The two finger configuration may provide additional contact area relative to a single finger configuration that may be preferred by some users. In another example, the two finger over-under configuration of the finger interface 2302 may allow a user to manipulate the removable trigger accessory 2300 using a middle finger and a ring finger. Such a configuration may allow for the user to user an index finger to control a bumper button positioned above the trigger on the game controller.

FIG. 24 shows a removable trigger accessory 2400 including a finger interface 2402 configured to bend below a bottom or finger-side 2404 of a game controller 2406 when the removable trigger accessory 2400 is removably affixed to the game controller 2406. For example, the bent configuration of the finger interface 2402 may change a finger manipulation angle of the trigger that allows a user to manipulate the removable trigger accessory 2400 from the finger-side 2404 of the game controller 2406 instead of a side that is perpendicular to the finger-side 2404. For example, the bent configuration of the finger interface 2402 may allow a user to manipulate the removable trigger accessory 2400 using a different finger, such as a ring finger. In another example, the bent configuration of the finger interface 2402 may allow a user to manipulate the removable trigger accessory 2400 using a non-traditional type of grip of the game controller 2406.

FIG. 25 shows a removable trigger accessory 2500 including an extra-large finger interface 2502 configured to extend both laterally along a front side of 2504 and longitudinally below a finger-side 2506 of a game controller 2508 when the removable trigger accessory 2500 is removably affixed to the game controller 2508. For example, the extra-large configuration of the finger interface 2502 may provide additional surface area to accommodate different grip styles (e.g., multiple fingers) or larger fingers relative to a traditional-sized finger interface sized to accommodate a single finger.

Different removable trigger accessories may be configured differently to provide different gameplay experiences. For example, different trigger accessories may include finger interfaces having different dimensions including different lengths, widths, and curvatures. In some implementations, a finger interface may include one or more bends and/or one or more twists relative to the portion of the removable trigger accessory on which a mounting interface is located. For example, a finger interface may bend upwards towards the thumb-side or downwards towards the finger-side. In another example, a finger interface may be twisted inwards towards the center of the game controller or outwards towards edges of the game controller. In another example, a finger interface may include a combination of one or more bends and one or more twists.

As another example, different removable trigger accessories may have finger interfaces having different cross-sectional shapes including circular or elliptical shapes, angular shapes including shapes having squared-off corners, and other suitable shapes. As another example, different removable trigger accessories may have finger interfaces having different degrees of convexity or concavity. As another example, different removable trigger accessories may have different textures including smooth textures, rough textures, or other suitable textures. Some textures may be formed from different material coatings applied to the finger interface. Other textures may be formed by a structure of the finger interface itself. A removable trigger accessory may include a finger interface sized, shaped, and/or textured in any suitable manner.

Additional aspects of the present disclosure are described below. According to one aspect, a game controller comprises a trigger-activation sensor, a sensor-activation feature moveable relative to the trigger-activation sensor, wherein the trigger-activation sensor outputs a control signal based on a relative position of the sensor-activation feature and the trigger-activation sensor, and a trigger-retention feature configured to removably affix a selected removable trigger accessory to the game controller, the selected removable trigger accessory being one of a plurality of differently configured removable trigger accessories removably affixable to the game controller, the selected removable trigger accessory configured to change the relative position of the sensor-activation feature and the trigger-activation sensor based on finger manipulation of the selected removable trigger accessory when the selected removable trigger accessory is removably affixed to the game controller. In this aspect, the trigger-retention feature may include one or more magnets, the selected removable trigger accessory may be made at least partially of ferromagnetic material, and the selected removable trigger accessory may be removably affixable to the game controller through a magnetic attraction between the one or more magnets and the ferromagnetic material. In this aspect, the selected removable trigger accessory may include one or more magnets, the trigger-retention feature may made at least partially of ferromagnetic material, and the selected removable controller accessory may be removably affixable to the game controller through a magnetic attraction between the one or more magnets and the ferromagnetic material. In this aspect, the selected removable trigger accessory may include a hook, and the trigger-retention feature may include a mating slot configured to receive the hook to removably affix the selected removable trigger accessory to the game controller. In this aspect, the trigger-retention feature and the hook may collectively form a pivot, and the selected removable trigger accessory may be configured to rotate about the pivot based on finger manipulation of the selected removable trigger accessory when the selected removable trigger accessory is removably affixed to the game controller. In this aspect, at least one of the plurality of differently configured removable trigger accessories may include an electronic module, and the trigger-retention feature may include an outlet configured to connect with the electronic module. In this aspect, the game controller may further comprise a spring biased to maintain the selected removable trigger accessory in a default posture when the selected removable trigger accessory is removably affixed to the game controller, and the plurality of differently configured removable trigger accessories may each include a different spring tensioner configured to differently adjust an amount of spring force applied by the spring. In this aspect, the game controller may further comprise a spring biased to maintain the selected removable trigger accessory in a default posture when the selected removable trigger accessory is removably affixed to the game controller, and the selected removable trigger accessory may include an adjustable spring tensioner configured to adjust an amount of spring force applied by the spring. In this aspect, the plurality of differently configured removable trigger accessories each may include a different range of motion adjuster configured to differently adjust a range of motion of the sensor-activation feature relative to the trigger-activation sensor. In this aspect, the game controller may further comprise a grip including a thumb-side including one or more controls configured to be manipulated by a thumb, and the trigger-retention feature may be configured to position the selected removable trigger accessory to be manipulated by an index finger when the selected removable trigger accessory is removably affixed to the game controller. In this aspect, the selected removable trigger accessory may extend beyond a finger-side of the grip that opposes the thumb side when the selected removable trigger accessory is removably affixed to the game controller.

According to another aspect, a game controller comprises a trigger-activation sensor, a sensor-activation feature moveable relative to the trigger-activation sensor, wherein the trigger-activation sensor outputs a control signal based on a relative position of the sensor-activation feature and the trigger-activation sensor, a trigger-retention feature including one or more magnets and configured to magnetically affix to the game controller a selected removable trigger accessory made at least partially of ferromagnetic material, the selected removable trigger accessory being one of a plurality of differently configured removable trigger accessories magnetically affixable to the game controller, the selected removable trigger accessory configured to change the relative position of the sensor-activation feature and the trigger-activation sensor based on finger manipulation of the selected removable trigger accessory when the selected removable trigger accessory is magnetically affixed to the game controller. In this aspect, the selected removable trigger accessory may include a hook, and the trigger-retention feature may include a mating slot configured to receive the hook to magnetically affix the selected removable trigger accessory to the game controller. In this aspect, the mating slot and the hook may collectively form a pivot, and the selected removable trigger accessory may be configured to rotate about the pivot based on finger manipulation of the selected removable trigger accessory when the selected removable trigger accessory is affixed to the game controller. In this aspect, at least one of the plurality of differently configured removable trigger accessories may include an electronic module, and the trigger-retention feature may include an outlet configured to connect with the electronic module. In this aspect, the game controller may further comprise a spring biased to maintain the selected removable trigger accessory in a default posture when the selected removable trigger accessory is magnetically affixed to the game controller, and the plurality of differently configured removable trigger accessories each may include a different spring tensioner configured to differently adjust an amount of spring force applied by the spring. In this aspect, the game controller may further comprise a spring biased to maintain the selected removable trigger accessory in a default posture when the selected removable trigger accessory is magnetically affixed to the game controller, and the selected removable trigger accessory may include an adjustable spring tensioner configured to adjust an amount of spring force applied by the spring. In this aspect, the plurality of differently configured removable trigger accessories each may include a different range of motion adjuster configured to differently adjust the range of motion of the sensor-activation feature.

According to another aspect, a game controller, comprises a trigger-activation sensor, a sensor-activation feature moveable relative to the trigger-activation sensor, wherein the trigger-activation sensor outputs a control signal based on a relative position of the sensor-activation feature and the trigger-activation sensor, a trigger-retention feature including one or more magnets and a mechanical retention feature, the one or more magnets configured to magnetically affix to the game controller a selected removable trigger accessory made at least partially of ferromagnetic material, the mechanical retention feature configured to mechanically affix the selected removable trigger accessory to the game controller through mechanical engagement of the mechanical retention feature and the selected removable trigger accessory, the selected removable trigger accessory being one of a plurality of differently configured removable trigger accessories magnetically and mechanically affixable to the game controller, the selected removable trigger accessory configured to change the relative position of the sensor-activation feature and the trigger-activation sensor based on finger manipulation of the selected removable trigger accessory when the selected removable trigger accessory is magnetically and mechanically affixed to the game controller. In this aspect, the game controller may further comprise a grip including a thumb-side including one or more controls configured to be manipulated by a thumb, and the trigger-retention feature may be configured to position the selected removable trigger accessory to be manipulated by an index finger when the selected removable trigger accessory is magnetically and mechanically affixed to the game controller.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various features disclosed herein, as well as any and all equivalents thereof.

The invention claimed is:

1. A game controller, comprising:
a trigger-activation sensor;
a sensor-activation feature moveable relative to the trigger-activation sensor, wherein the trigger-activation sensor outputs a control signal based on a relative position of the sensor-activation feature and the trigger-activation sensor; and
a mounting platform including a trigger-retention feature configured to removably affix a selected removable trigger accessory to the mounting platform, the selected removable trigger accessory being one of a plurality of differently configured removable trigger accessories removably affixable to the mounting platform, the selected removable trigger accessory configured to change the relative position of the sensor-activation feature and the trigger-activation sensor based on finger manipulation of the selected removable trigger accessory when the selected removable trigger accessory is removably affixed to the mounting platform, and the mounting platform being configured to move with the selected removable trigger accessory responsive to finger manipulation of the selected removable trigger accessory when the selected removable trigger accessory is affixed to the mounting platform.

2. The game controller of claim 1, wherein the trigger-retention feature includes one or more magnets, wherein the selected removable trigger accessory is made at least partially of ferromagnetic material, and wherein the selected removable trigger accessory is removably affixable to the mounting platform through a magnetic attraction between the one or more magnets and the ferromagnetic material.

3. The game controller of claim 1, wherein the selected removable trigger accessory includes one or more magnets, wherein the trigger-retention feature is made at least partially of ferromagnetic material, and wherein the selected removable trigger accessory is removably affixable to the mounting platform through a magnetic attraction between the one or more magnets and the ferromagnetic material.

4. The game controller of claim 1, wherein the selected removable trigger accessory includes a hook, and wherein the trigger-retention feature includes a mating slot configured to receive the hook to removably affix the selected removable trigger accessory to the mounting platform.

5. The game controller of claim 4, wherein the trigger-retention feature and the hook collectively form a pivot, and wherein the selected removable trigger accessory is configured to rotate about the pivot based on finger manipulation of the selected removable trigger accessory when the selected removable trigger accessory is removably affixed to the mounting platform.

6. The game controller of claim 1, wherein at least one of the plurality of differently configured removable trigger accessories includes an electronic module, and wherein the trigger-retention feature includes an outlet configured to connect with the electronic module.

7. The game controller of claim 1, further comprising:
a spring biased to maintain the selected removable trigger accessory in a default posture when the selected removable trigger accessory is removably affixed to the mounting platform, and wherein the plurality of differently configured removable trigger accessories each include a different spring tensioner configured to differently adjust an amount of spring force applied by the spring.

8. The game controller of claim 1, further comprising:
a spring biased to maintain the selected removable trigger accessory in a default posture when the selected removable trigger accessory is removably affixed to the mounting platform, and wherein the selected removable trigger accessory includes an adjustable spring tensioner configured to adjust an amount of spring force applied by the spring.

9. The game controller of claim 1, wherein the plurality of differently configured removable trigger accessories each include a different range of motion adjuster configured to differently adjust a range of motion of the sensor-activation feature relative to the trigger-activation sensor.

10. The game controller of claim 1, further comprising:
a grip including a thumb-side including one or more controls configured to be manipulated by a thumb, and wherein the trigger-retention feature is configured to position the selected removable trigger accessory to be manipulated by an index finger when the selected removable trigger accessory is removably affixed to the mounting platform.

11. The game controller of claim 10, wherein the selected removable trigger accessory extends beyond a finger-side of the grip that opposes the thumb side when the selected removable trigger accessory is removably affixed to the mounting platform.

12. A game controller, comprising:
a trigger-activation sensor;
a sensor-activation feature moveable relative to the trigger-activation sensor, wherein the trigger-activation sensor outputs a control signal based on a relative position of the sensor-activation feature and the trigger-activation sensor;
a mounting platform including a trigger-retention feature including one or more magnets and configured to magnetically affix to the mounting platform a selected removable trigger accessory made at least partially of ferromagnetic material, the selected removable trigger accessory being one of a plurality of differently configured removable trigger accessories magnetically affixable to the mounting platform, the selected removable trigger accessory configured to change the relative position of the sensor-activation feature and the trigger-activation sensor based on finger manipulation of the selected removable trigger accessory when the selected removable trigger accessory is magnetically affixed to the mounting platform, and the mounting platform being configured to move with the selected removable trigger accessory responsive to finger manipulation of the selected removable trigger accessory when the selected removable trigger accessory is affixed to the mounting platform.

13. The game controller of claim 12, wherein the selected removable trigger accessory includes a hook, and wherein the trigger-retention feature includes a mating slot configured to receive the hook to magnetically affix the selected removable trigger accessory to the mounting platform.

14. The game controller of claim 13, wherein the mating slot and the hook collectively form a pivot, and wherein the selected removable trigger accessory is configured to rotate about the pivot based on finger manipulation of the selected removable trigger accessory when the selected removable trigger accessory is affixed to the mounting platform.

15. The game controller of claim 12, wherein at least one of the plurality of differently configured removable trigger accessories includes an electronic module, and wherein the trigger-retention feature includes an outlet configured to connect with the electronic module.

16. The game controller of claim 12, further comprising:
a spring biased to maintain the selected removable trigger accessory in a default posture when the selected removable trigger accessory is magnetically affixed to the mounting platform, and wherein the plurality of differently configured removable trigger accessories each include a different spring tensioner configured to differently adjust an amount of spring force applied by the spring.

17. The game controller of claim 12, further comprising:
a spring biased to maintain the selected removable trigger accessory in a default posture when the selected removable trigger accessory is magnetically affixed to the mounting platform, and wherein the selected removable trigger accessory includes an adjustable spring tensioner configured to adjust an amount of spring force applied by the spring.

18. The game controller of claim 12, wherein the plurality of differently configured removable trigger accessories each include a different range of motion adjuster configured to differently adjust the range of motion of the sensor-activation feature.

19. A game controller, comprising:
a trigger-activation sensor;
a sensor-activation feature moveable relative to the trigger-activation sensor, wherein the trigger-activation sensor outputs a control signal based on a relative position of the sensor-activation feature and the trigger-activation sensor;
a mounting platform including a trigger-retention feature including one or more magnets and a mechanical retention feature, the one or more magnets configured to magnetically affix to the mounting platform a selected removable trigger accessory made at least partially of ferromagnetic material, the mechanical retention feature configured to mechanically affix the selected removable trigger accessory to the mounting platform through mechanical engagement of the mechanical retention feature and the selected removable trigger accessory, the selected removable trigger accessory being one of a plurality of differently configured removable trigger accessories magnetically and mechanically affixable to the mounting platform, the selected removable trigger accessory configured to change the relative position of the sensor-activation feature and the trigger-activation sensor based on finger manipulation of the selected removable trigger accessory when the selected removable trigger accessory is magnetically and mechanically affixed to the mounting platform, and the mounting platform being configured to move with the selected removable trigger accessory responsive to finger manipulation of the selected removable trigger accessory when the selected removable trigger accessory is affixed to the mounting platform.

20. The game controller of claim 19, further comprising:
a grip including a thumb-side including one or more controls configured to be manipulated by a thumb, and wherein the trigger-retention feature is configured to position the selected removable trigger accessory to be manipulated by an index finger when the selected removable trigger accessory is magnetically and mechanically affixed to the mounting platform.

\* \* \* \* \*